United States Patent [19]
Johnson

[11] Patent Number: 5,839,760
[45] Date of Patent: Nov. 24, 1998

[54] TRAILER MOUNTED ACCESSORIES

[76] Inventor: Douglas M. Johnson, 7148 E. Brainerd Rd., Chattanooga, Tenn. 37421

[21] Appl. No.: 743,876

[22] Filed: Nov. 6, 1996

[51] Int. Cl.$^6$ ....................................................... B60R 9/00
[52] U.S. Cl. ..................... 280/768; 224/538; 248/228.3; 280/769; 296/37.6; 414/462
[58] Field of Search ................... 248/228.1, 228.3, 248/228.5; 414/462, 498, 522; 224/538; 296/37.1, 37.6; 280/768, 769, 154

[56] References Cited

U.S. PATENT DOCUMENTS

| | | | |
|---|---|---|---|
| 3,053,494 | 9/1962 | Stoll | 248/228.3 |
| 4,049,312 | 9/1977 | Rudbeck | 296/37.1 X |
| 4,062,519 | 12/1977 | Jacobs | 248/228.3 |
| 4,418,853 | 12/1983 | Shaffer | 296/37.1 X |
| 4,564,134 | 1/1986 | Selbert | 296/37.1 X |
| 4,593,786 | 6/1986 | Tate | 280/769 X |
| 4,772,063 | 9/1988 | Amy | 296/37.1 |
| 4,878,605 | 11/1989 | Doyle | 296/37.6 X |
| 4,890,970 | 1/1990 | Willits | 296/37.1 X |
| 5,125,710 | 6/1992 | Gianelo | 296/37.1 |
| 5,280,990 | 1/1994 | Rinard | 296/37.6 X |
| 5,310,303 | 5/1994 | Betts | 414/462 |
| 5,501,504 | 3/1996 | Kunz | 296/37.1 X |

*Primary Examiner*—Brian L. Johnson
*Assistant Examiner*—Michael Mar

[57] ABSTRACT

A mounting system for mounting accessories such as external container packages and splash reducing wheel cover skirts on trailers having a body including a floor which is supported on the exterior by longitudinally spaced apart transversely extending I-beams, the mounting system including fixed L-shaped latches for engaging the web and the lower flange at one side of an I-beam and moveable latch members for engaging the web and lower flange at the other side. The moveable latch members are carried by a slide plate on the lower surface of which is secured a rack, the rack being in mesh with a pinion gear. The pinion gear is rotatably mounted within the accessory and may be rotated manually from the exterior of the accessory to move the moveable latches into clamping engagement or to release such engagement.

18 Claims, 5 Drawing Sheets

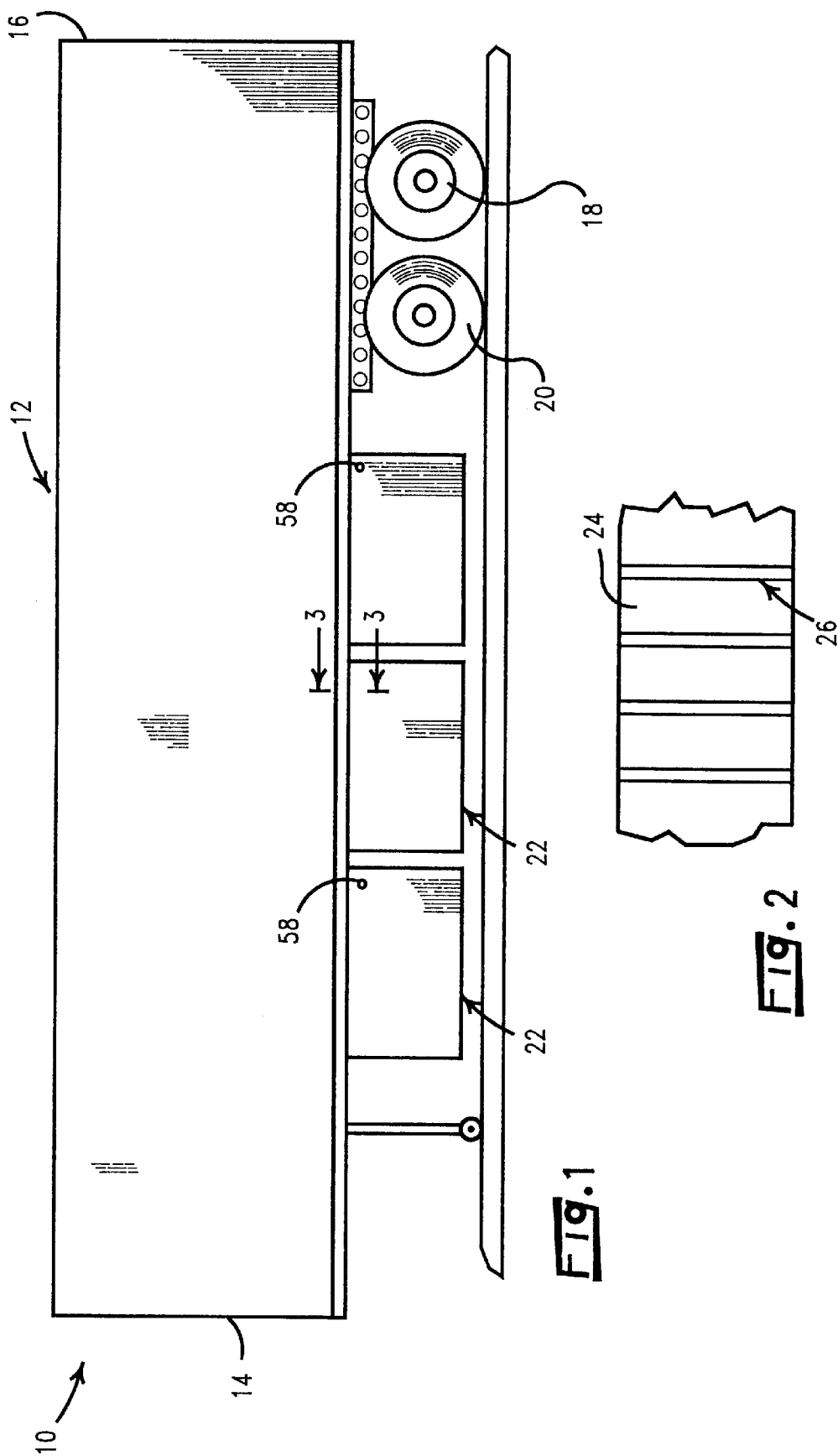

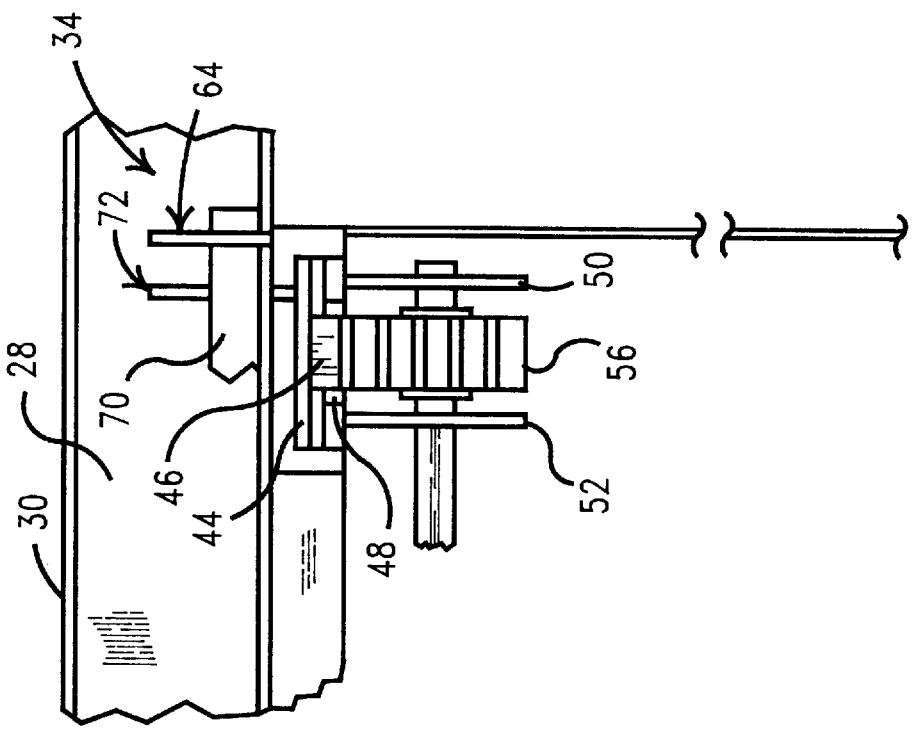
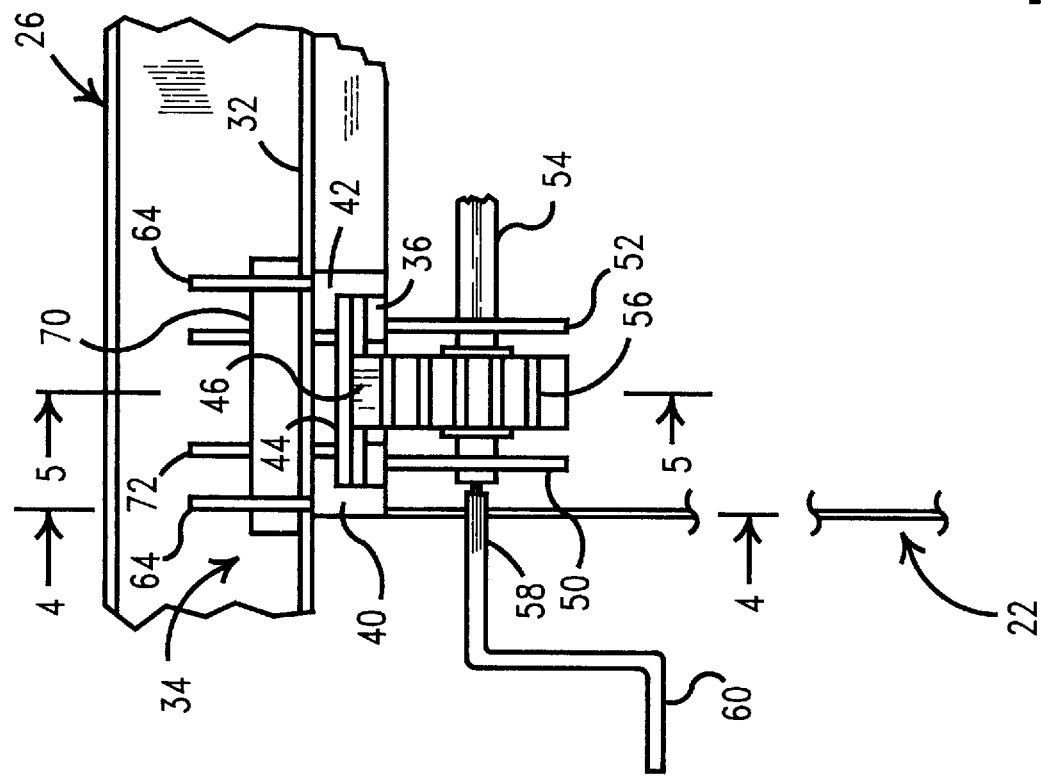
Fig. 3

TRAILER MOUNTED ACCESSORIES

BACKGROUND OF THE INVENTION

This invention relates to a truck or tractor trailer mounting system and more particularly to such a mounting system for carrying containers and for attaching wheel splash covers or skirts to the exterior of the floor of the trailer body without modification of trailer.

It is desirable for large fully loaded load carrying cab drawn tractor trailers, i.e., semi-trailers, to carry additional loads by way of storage containers or packages mounted externally that could be shipped between cities or towns that are geographically spaced relatively close together. Such containers not only would increase the load handling capabilities of such vehicles, but would result in cost effective shipments of small loads to close by locations. By mounting the storage container on the exterior of the trailer, a trailer which has a long haul will not be required to stop for any extended period to load and unload such packages. Thus, the delay in route to the end point of a long distance haul may be minimal, yet the shipping charges for the packages may be at a premium since the delivery time would in all probability be less than if delivered by other modes.

The prior art, however, has not made a practicable proposal for such storage container or package carrying systems. Most of the art is directed at pallet carriers such as U.S. Pat. Nos. 4,890,970 (Willits), 4,418,853 (Schaffer) and 4,564,134 (Seibert). U.S. Pat. Nos. 5,310,303 (Betts), 5,125,710 (Gianell), 4,772,063 (Amy), 4,049,312 (Rudbeck) and 3,240,409 (Lapansie) do however, show various storage or container mounting systems. The only known prior art reference that appears to propose a package mounting system readily mountable below the bed of the trailer is the aforesaid Lapansie patent which mounts trapezoidal shaped containers for carrying granular materials and wherein the containers are alternated so that one container has a larger dimensioned parallel surface intermediate the smaller dimensioned parallel surfaces of two other containers.

Additionally, any one who has ever driven on a highway in the rain knows the hazards created by tractor trailers as the water on the road is splashed upwardly and outwardly by the tires of the trailer. It is well known that tractor trailers do not have effective splash guards. Additionally although wheel skirts would prevent such splashing or spraying of road water, skirts are not presently possible since tractor trailers generally do not have wheel wells. The wheels are completely exposed on the sides so that the tire pressure can be readily checked and the tires inflated when required. Known skirts for vintage automobiles clipped onto the sides of the vehicle adjacent the wheel wells, but trailers as aforesaid do not generally have such wheel wells and those trailers that may have wells, do not have well openings large enough for such skirts.

The floors of conventional trailer bodies are reinforced with I-shaped beams which extend transversely from side-to-side externally of the body, the beams being equally spaced apart longitudinally. In the prior art there is no known proposal to utilize these beams for convenient package transportation or for mounting wheel covers for preventing rain water from being thrown up from the road by the tires of the trailer.

SUMMARY OF THE INVENTION

Consequently, it is a primary object of the present invention to provide tractor or truck trailer accessories which may be mounted readily externally to the floor support structure of the body of the trailer and which may be dismounted readily.

It is another object of the present invention to provide storage containers that may be mounted readily beneath the floor of the body of a tractor trailer permitting the trailer to transport additional loads without requiring the additional load to be carried within the trailer body and without requiring modification of the trailer.

It is a further object of the present invention to provide wheel skirts that may be mounted readily beneath the floor of the body of a tractor trailer to cover side portions of the tires of the trailer and prevent splashing of water outwardly when the trailer is driven under rainy or wet conditions without requiring modification of the trailer.

Accordingly, the present invention provides a mounting system for mounting accessories such as external packages and splash cover skirts for conventional trailer trucks having bodies with floors reinforced outside the body by equally spaced apart web and flange beams, the accessories utilizing this feature and having a series of latch members that may overlay and substantially interlock with corresponding flanges of the beams.

One aspect of the present invention is the mounting of storage containers or packages while another aspect is the mounting of splash arresting wheel covers or skirts. Both aspects utilize latch members which extend upwardly from the respective container or skirt, each latch member including a leg projecting outwardly at an angle to the upstanding portion of the member for resting upon a lower flange of a respective beam. The latch members have substantially L-shape configurations. Preferably there are both fixed and moveable latch members between which the web of an I-beam is clamped. The moveable latch members are mounted on a slide plate which can be moved by rack and pinion means to clamp or release the I-beam.

BRIEF DESCRIPTION OF THE DRAWINGS

The particular features and advantages of the invention as well as other objects will become apparent from the following description taken in connection with the accompanying drawings in which:

FIG. 1 is an elevational view of a tractor trailer supporting load carrying containers beneath the floor in accordance with the principles of the present invention;

FIG. 2 is a bottom plan view of the floor of the trailer with the containers removed;

FIG. 3 is a fragmentary cross sectional view taken substantially along line 3—3 of FIG. 1 partly broken away to illustrate a portion of a container;

DESCRIPTION OF THE PREFERRED EMBODIMENTS

Figure 4:
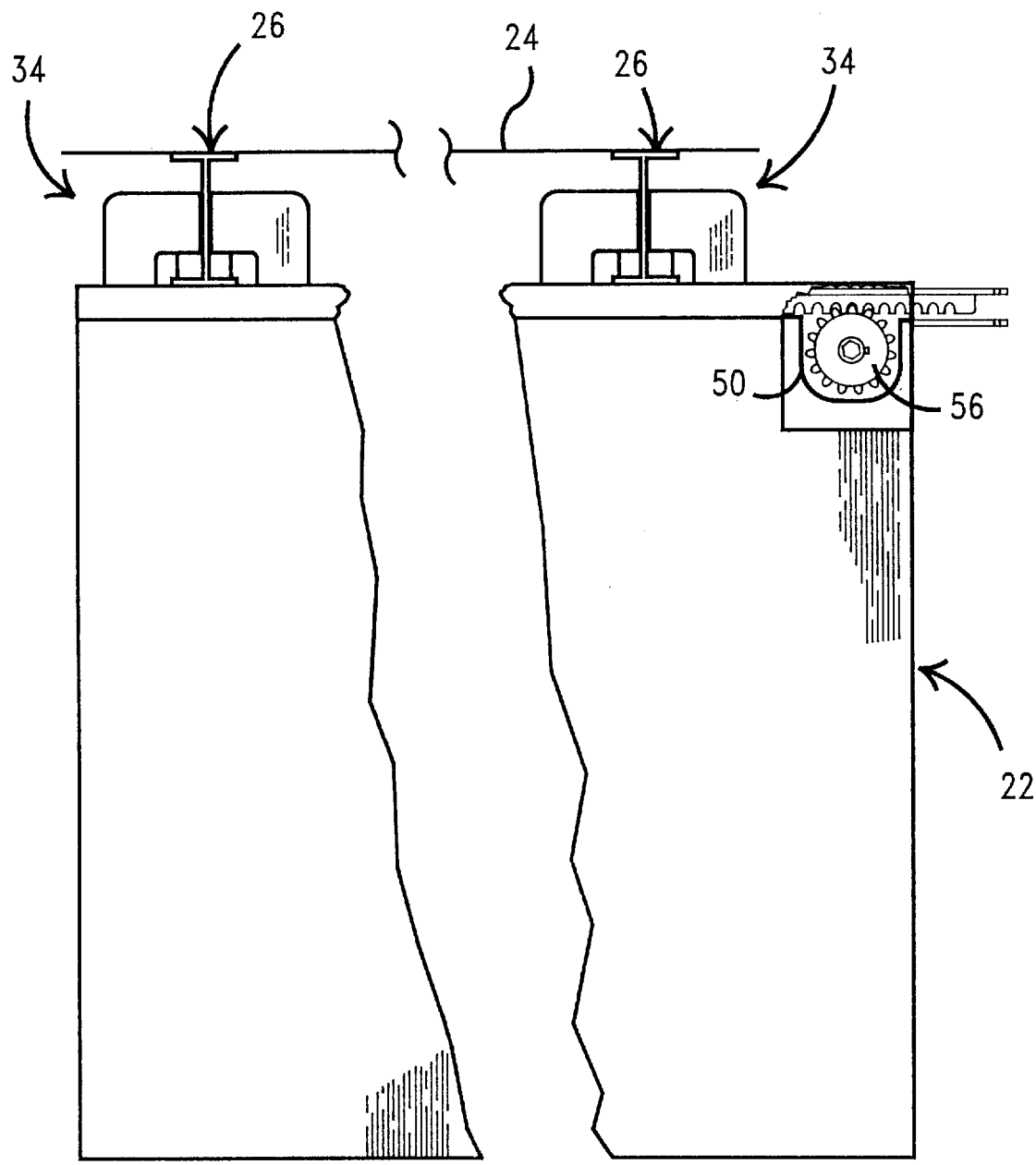
FIG. 4 is a cross sectional view taken substantially along line 4—4 of FIG. 3.

Referring to the drawings, FIG. 1 illustrates a conventional tractor trailer 10 comprising a substantially longitudinally extending body 12 extending from a front end 14 to a rear end 16. The trailer conventionally includes wheels 18 on which tires 20 are mounted adjacent the rear end. Carried by the trailer beneath the body are a number of transportable containers 22 constructed in accordance with the principles of the present invention as hereinafter described, the number of such containers that may be carried being dependent upon the length of the trailer and the length of the containers. Conventionally, as illustrated in FIG. 2, the body of the trailer includes a floor 24, which on the exterior is braced or supported by transversely extending I-shaped beams 26 equally spaced apart longitudinally and extending transversely across the trailer. The beams as clearly illustrated in FIGS. 3, 4 and 5 have a central web 28 intermediate a pair of flanges comprising an upper flange 30 and a lower flange 32.

As best illustrated in FIGS. 3 and 4 each container has a substantially parallelepiped shaped configuration including a pair of spaced apart plurality of latch assemblies 34, their being one such plurality of assemblies extending lengthwise along each upper edge of the container with each assembly being spaced from adjacent assemblies by a distance substantially equal to the distance between adjacent I-beams 26. Each assembly 34 comprises a bar 36 fixed to the container 22 by bolts or the like adjacent the laterally extending edge, the bar being approximately five inches wide. Secured to each edge of the bar is a respective right angle beam 40, 42 of approximately one inch square by ¼ thick, the space between the angle beams forming a slideway within which a slide plate or slide bar 44 is positioned. Secured to the underside of the slide plate or slide bar 44 at and adjacent one end thereof is a small length of rack 46, the rack having teeth disposed downwardly away from the plate 44 and being positioned within an accommodating slot 48 in the corresponding end of the fixed bar 36 so that it is moveable a small distance into and outside the end of the container 22.

Depending downwardly from the container and associated with each pair of latch assemblies adjacent the end at which the rack is located is a pair of bracket members 50, 52 which journally support a rod 54 that extends across the container. Mounted on the rod 54 between the brackets 50, 52 at each side is a respective pinion gear 56 that meshes with teeth on the respective rack 46. At one side of the container there is an opening 58 in the wall for receiving an end of a removable crank member 60, that end of the crank being of a polygon shape and receivable within a recess 62 of the same configuration in the corresponding end of the rod 54. Thus, rotation of the crank 60 will result in the slide plate 44 at each side moving longitudinally an amount determined by the movement of the crank and the length of the rack.

Figure 5:
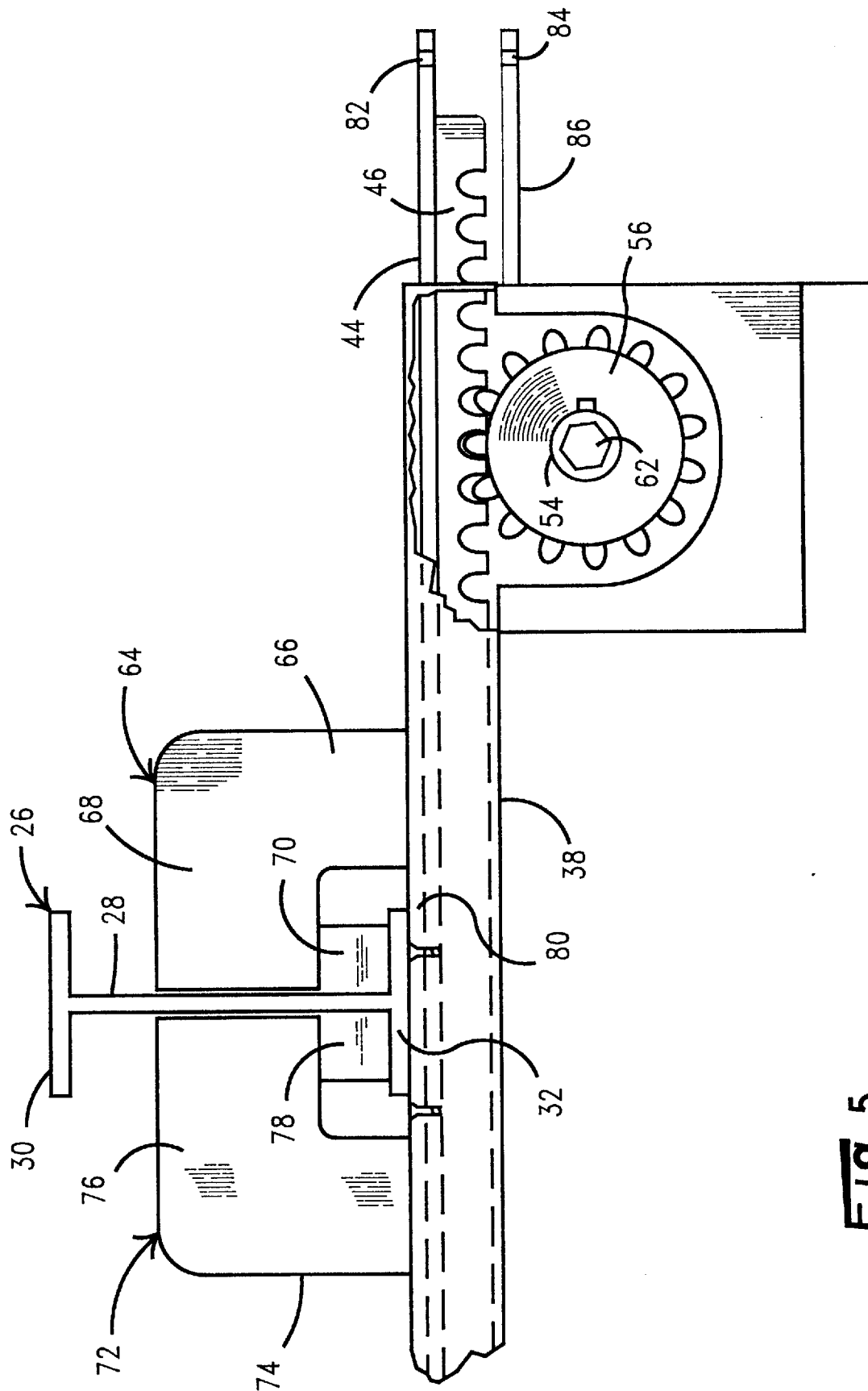
FIG. 5 is an enlarged sectional view taken substantially along line 5—5 of FIG. 3.

Fastened to each of the angle beams 40, 42 at each assembly is a respective fixed latch member 64, each of which has a substantially inverted L-shaped configuration having an upstanding leg 66 and a longitudinally extending leg 68, all the legs 68 facing in the same direction. The latch members 64 may be approximately ¼ inch thick stainless steel and are preferably welded to a bar 70 that extends from one side to the other across the container, the bar 70 being of a size adapted to be disposed on half of the flange 32 of an I-beam 26 as illustrated in FIG. 5. Secured as by welding to each slide plate 44 offset transversely relative to a respective latch 64 is a moveable latch member 72 of similar shape as the latch member 64 having an upstanding leg 74 and a longitudinally extending leg 76, the legs 76 facing in the opposite direction to the legs 68. Moreover, the latch members 72 across the width of the container preferably are welded to a common bar 78 similar to the bar 70 for resting on the other half of the I-beam flanges 32 when moved into clamping position with the latch 72 and the bar 78 abutting the web 28 of the I-beam. A bushing 80, preferably of brass, is fastened to the slide plate 44 and is disposed such that when the moveable latches 72 are in clamping position the bushing 80 is wedged below the flange 32, thereby to limit or eliminate vertical movement of the latching assemblies when the trailer is being driven on the road. Additionally, a latch pin (not illustrated) may extend through apertures 82, 84 respectively in the slide plate 44 and a fixed bar or plate 86 secured to the end of the container 22 to prevent the slide plate from moving inadvertently.

In operation, when the container 22 is to be mounted under the trailer, the crank 60 is rotated to open the longitudinal spacing between the moveable latches 72 and the respective fixed latches 64 for a respective I-beam 26. The container is then positioned by a pallet jack or the like so that the latch members aligned across the container are disposed for clamping about a respective I-beam 26 and the crank 60 is then rotated in the opposite direction to clamp the I-beam between the pairs of transversely aligned latches. Such a transverse alignment of latch assemblies is required to clamp onto at least two longitudinally spaced apart I-beams, although there may be latch assemblies corresponding to a plurality of I-beams disposed across the ends of the container. Thus, although only two such assemblies are illustrated in FIG. 4, it should be understood that others are anticipated between these two.

Figure 7:
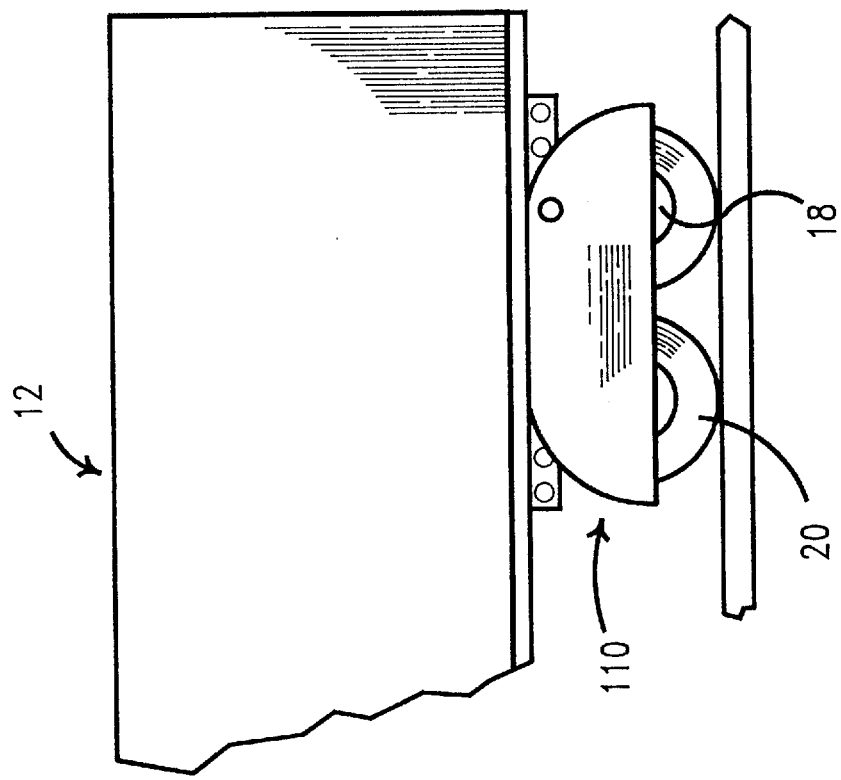
FIG. 7 is an elevational view of the skirt illustrated in FIG. 6 attached to a trailer having a set of tandem wheels.
Figure 6:
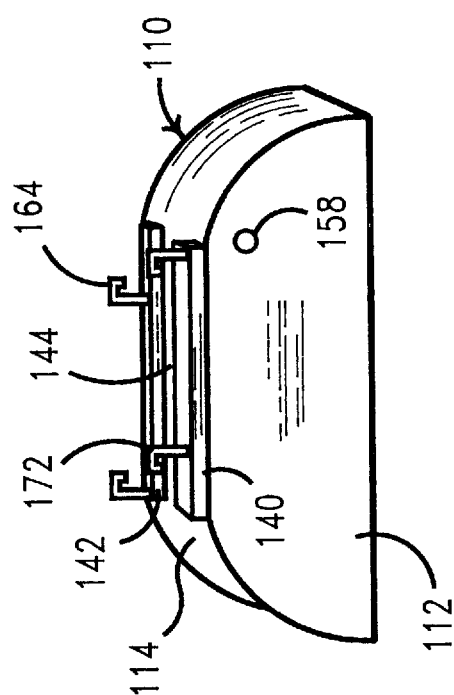
FIG. 6 is a perspective view illustrating a wheel covering skirt constructed in accordance with the principles of the present invention.

In accordance with another aspect of the present invention, wheel covering skirts 110 have a latching structure similar to that for the containers for attachment of the skirts to the I-beams of the trailer. As illustrated, the skirt has a wheel covering side surface 112 and an upper surface 114 for overlaying the wheel. Secured to the upper surface 114 is structure defining a single slideway within which a slide plate 144 may slide, the slideway carrying moveable latches 172 while angle members 140, 142 similar to the members 40, 42 carry fixed latches. The slide plate 144 and thus the moveable latches are moved by a crank driven rack and pinion system in the same manner as those on the containers 22, the crank being inserted into a hole 158 in the surface 112 of the skirt. The skirt may be utilized with a tandem wheel tractor trailer as illustrated in FIG. 7 or with a trailer having a single wheel arrangement (not illustrated) merely be sizing the skirt accordingly. With the skirt in position most water will not be thrown up and out onto passing vehicles. When the tires are to be checked for air pressure and/or inflated, the skirts may be readily removed and thereafter reinstalled.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A mounting system for removeably mounting an accessory on a conventional load-carrying elongated trailer, said trailer having a longitudinal axis having a body supported by wheel mounted tires for being transported on a road, said trailer including a floor and a plurality of longitudinally spaced apart transversely extending floor supporting substantially I-shaped beams disposed beneath said floor, said I-shaped beams having a cross sectional configuration including upper and lower flanges connected together by a central web for structurally supporting said floor, said accessory comprising a body member having a plurality of longitudinally) spaced apart latch assemblies, each latch assembly comprising a fixed latch member and a moveable latch member, said fixed latch members being fixedly mounted to said body at predetermined longitudinally spaced locations means for mounting each moveable latch member offset transversely from the corresponding fixed latch member and moveable longitudinally relative thereto, each of said fixed latch members having a configuration including a longitudinally extending leg having a free end, the free ends of all of said fixed latch members projecting in a same direction, each of said moveable latch members having a configuration including a longitudinally extending leg having a free end, the free ends of all said moveable latch members projecting in a same direction which is opposite to the direction of the free ends of said fixed latch members and means for moving said moveable latch members together to clamp the lower flanges of selected ones of said between fixed latch members and moveable latch members of said plurality of latch assemblies to secure the accessory to the trailer.

2. A mounting system as recited in claim 1, wherein said means for mounting each moveable latch member comprises means secured to the body of said accessory for forming a longitudinally extending slideway, a slide plate slideably mounted in said slideway, said moveable latch member being secured to said slide plate.

3. A mounting system as recited in claim 2, wherein said means for moving said moveable latch members comprises rack and pinion means operatively connected to said slide plate to move said slide plate selectively.

4. A mounting system as recited in claim 3, wherein said rack and pinion means comprises a rack fastened to said slide plate and having teeth depending downwardly, a pinion gear rotatably mounted beneath said rack and having teeth in mesh with the teeth of said rack, and means for rotating said gear to move said rack and thereby said slide plate.

5. A mounting system as recited in claim 1, wherein said fixed latch members and said moveable latch members include means for engaging the lower flange of an I-shaped beam, said fixed latch members being disposed on one side of the corresponding web and said moveable latch members being disposed at an opposite side of the respective web.

6. A mounting system as recited in claim 5, wherein said means for mounting each moveable latch member comprises means secured to the body of said accessory for forming a longitudinally extending slideway, a slide plate slideably mounted in said slideway, said moveable latch member being secured to said slide plate.

7. A mounting system as recited in claim 6, wherein said means for moving said moveable latch members comprises rack and pinion means operatively connected to said slide plate to move said slide plate selectively.

8. A mounting system as recited in claim 7, wherein said rack and pinion means comprises a rack fastened to said slide plate and having teeth depending downwardly, a pinion gear rotatably mounted beneath said rack and having teeth in mesh with the teeth of said rack, and means for rotating said gear to move said rack and thereby said slide plate.

9. A mounting system as recited in claim 1, wherein said accessory comprises a storage container having a substantially parallelepiped configuration, there being latch assemblies adjacent transversely spaced apart upper longitudinally extending edges.

10. A mounting system as recited in claim 9, wherein said means for mounting each moveable latch member comprises means secured to said container for forming a longitudinally extending slideway, a slide plate slideably mounted in said slideway, said moveable latch member being secured to said slide plate.

11. A mounting system as recited in claim 10, wherein said means for moving said moveable latch members comprises rack and pinion means operatively connected to said slide plate to move said slide plate selectively.

12. A mounting system as recited in claim 11, wherein said rack and pinion means comprises a rack fastened to said slide plate and having teeth depending downwardly, a pinion gear rotatably mounted beneath said rack and having teeth in mesh with the teeth of said rack, and means for rotating said gear to move said rack and thereby said slide plate.

13. A mounting system as recited in claim 12, wherein said fixed latch members and said moveable latch members include means for engaging the lower flange of an I-shaped beam, said fixed latch members being disposed on one side of the corresponding web and said moveable latch members being disposed at an opposite side of the respective web.

14. A mounting system as recited in claim 1, wherein said accessory comprises a skirt for covering at least side facing portions of said tires to prevent water on said road from being splashed outwardly away from said trailer, said skirt including an upper surface overlaying a respective tire, said latch assembly being disposed on said upper surface.

15. A mounting system as recited in claim 14, wherein said means for mounting each moveable latch member comprises means secured to the body of said accessory for forming a longitudinally extending slideway, a slide plate slideably mounted in said slideway, said moveable latch member being secured to said slide plate.

16. A mounting system as recited in claim 15, wherein said means for moving said moveable latch members comprises rack and pinion means operatively connected to said slide plate to move said slide plate selectively.

17. A mounting system as recited in claim 16, wherein said rack and pinion means comprises a rack fastened to said slide plate and having teeth depending downwardly, a pinion gear rotatably mounted beneath said rack and having teeth in mesh with the teeth of said rack, and means for rotating said gear to move said rack and thereby said slide plate.

18. A mounting system as recited in claim 17, wherein said fixed latch members and said moveable latch members include means for engaging the lower flange of an I-shaped beam, said fixed latch members being disposed on one side of the corresponding web and said moveable latch members being disposed at an opposite side of the respective web.

* * * * *